UNITED STATES PATENT OFFICE.

NATHAN SULZBERGER, OF NEW YORK, N. Y.

PROCESS FOR MAKING AND PRODUCT CONTAINING ALBUMINOUS MATTER FROM ANIMAL OR VEGETABLE ORIGIN.

1,160,783. Specification of Letters Patent. Patented Nov. 16, 1915.

No Drawing. Application filed June 24, 1911. Serial No. 635,063.

*To all whom it may concern:*

Be it known that I, NATHAN SULZBERGER, a citizen of the United States of America, residing at Hotel Netherland, Fifty-ninth street and Fifth avenue, city and county of New York, State of New York, have invented new and useful Improvements in a Process for Making and in a Product Containing Albuminous Matter from Animal or Vegetable Origin, of which the following is a specification.

My invention relates to a product, as well as to the process for preparing the same, consisting in mixing with or embodying in flour, meat or vegetable albumin (or product or parts containing meat or vegetable albumin) in its natural as well as in its peptonized state, which latter state may be produced by any of the known means of peptonization, which product is then baked. Flavoring and spicing, fresh or dried vegetable matter, etc., may be added agreeable to suit taste. The finished product can be made into the form of a cracker, biscuit or into some other suitable form. The same may also be put up in the form of a "sandwich," the two outside layers being composed of a baked product of flour dough (two crackers) in the center of which is a material prepared from fresh or peptonized vegetable or animal albumin, suitably seasoned, spiced and flavored. The product may also contain only a product of animal or vegetable origin or of a mixture of these. Instead of mixing the dough-like substance or flour with the animal or vegetable albumin and then baking the same, the latter may also be mixed with bread or cracker dust; that is, with the flour or dough after the same has already been baked. The product may also contain a fatty or oily substance of animal or vegetable origin, and also, if so desired, may contain products of a carbohydrate nature, such as sugar, chocolate, etc. Into the product may also be embodied other ingredients of beneficial, nourishing, stimulative or pharmaceutical action, as, for instance, pepsin, &c.

If the product is derived only from substances of vegetable origin, the same is of special value for vegetarians and all those who for dietary or other reasons (as, for instance, of a religious nature, as for example when such product is to be used by the orthodox Jewish population, which product is generally designated by the term "kosher," which term literally translated meaning "clean" designates the product as being prepared in accordance with their strict dietary religious regulations) prefer a product derived from vegetable sources only.

The product ("bouillon-cracker") may be consumed either by mixing same with hot water, (or in a soup or gravy, etc.) thereby forming a soup or bouillon like preparation containing cracker, etc., like material, or the product may be consumed directly as a cracker- or biscuit-like preparation. The product will, of course, be preferably different as to quality and quantities of ingredients used, depending on its use for direct consumption or for its use in aqueous mixtures. In the latter form there will preferably be more salt added and also a greater amount of the albumin containing matter of vegetable or animal origin. Or for this latter purpose several crackers, etc., which were originally made for direct consumption can be used.

The various modifications, which will suggest themselves to a man skilled in the art as to the employment of materials, etc., as to quality and quantity and also as to modifications of the process are to be considered as coming under the scope of this invention.

I claim:

1. A baked product of flour dough containing added albumin which has been treated so as to be soluble in water.

2. A baked product of flour dough containing added vegetable albumin which has been treated so as to be soluble in water.

3. A baked product of flour dough containing added peptonized vegetable albumin.

4. A baked product of flour dough containing added peptonized vegetable albumin soluble in water.

5. A baked product containing added peptones, which, when placed in hot water will produce a broth of the peptones containing the baked product.

6. A baked product of flour dough containing added water soluble albuminous matter, which when placed in hot water will produce a broth of the albuminous matter containing the baked product.

7. A baked product of flour dough containing added albuminous matter held in the said product by the baking of the latter, and which albuminous matter has been treated so as to be soluble in water.

8. A baked product for producing a food of broth and bread consisting of a baked body of flour dough containing broth producing matter which has been treated so as to be soluble in water and adapted to be dissolved out of said body when the latter is softened in a liquid.

9. A baked product of flour dough containing added peptone.

10. A baked product of flour dough containing peptonized albumin and a fatty or oily substance.

11. A baked product of flour dough containing peptonized albumin.

12. A baked product of flour dough containing peptonized albumin, seasoning, spice, and fat.

13. A baked product of flour dough containing water soluble peptonized albumin, seasoning, spice and fat.

NATHAN SULZBERGER.

Witnesses:
WM. C. BUETHE,
JAMES A. HOWARD.